(12) United States Patent
Drinan

(10) Patent No.: US 7,530,584 B2
(45) Date of Patent: May 12, 2009

(54) ADJUSTABLE ANTI-ROLL BAR FOR VEHICLES

(76) Inventor: Danny J. Drinan, 2460 Wigeon Ct., Indianapolis, IN (US) 46234

( * ) Notice: Subject to any disclaimer, the term of this patent is extended or adjusted under 35 U.S.C. 154(b) by 0 days.

(21) Appl. No.: 11/861,591

(22) Filed: Sep. 26, 2007

(65) Prior Publication Data
US 2009/0079177 A1    Mar. 26, 2009

(51) Int. Cl.
*B60G 21/055* (2006.01)
(52) U.S. Cl. ............................................. 280/124.107
(58) Field of Classification Search .......... 280/124.107, 280/124.137, 124.152, 124.166; 267/188, 267/273, 277
See application file for complete search history.

(56) References Cited

U.S. PATENT DOCUMENTS

| 3,490,786 | A  | * | 1/1970 | Ravenel | 280/124.101 |
| 6,554,305 | B2 | * | 4/2003 | Fulks | 280/124.107 |
| 7,270,336 | B2 | * | 9/2007 | Fujimori | 280/5.511 |
| 2007/0001417 | A1 | * | 1/2007 | Minoshima | 280/124.107 |

FOREIGN PATENT DOCUMENTS

| EP | 393399 | A1 | * | 10/1990 |
| JP | 02117410 | A | * | 5/1990 |

OTHER PUBLICATIONS

Anti-Roll Bar Rear—Information, http://www.mytsn.com/publ/publ.asp?sn=2&pid=3552&exp=9, pp. 1-2, accessed on Jun. 14, 2006.
Anti-Roll Bars, http://www.turnfast.com/tech_handling/handling_antiroll.shtml, pp. 1-3, accessed on Jun. 14, 2006.
Cockpit Adjustable Anti-Roll Bars, http://www.jaytorborg.com/anti-roll_bars.htm, pp. 1-3, accessed on Jun. 14, 2006.
Technobabble: Nov. 2000, http://www.sportcompactcarweb.com/editors/technobabble/0011scc_t..., pp. 2-4, accessed on Jun. 14, 2006.

* cited by examiner

*Primary Examiner*—Faye M. Fleming
(74) *Attorney, Agent, or Firm*—Woodard, Emhardt, Moriarty, McNett & Henry LLP

(57) ABSTRACT

An adjustable anti-roll bar for a vehicle having a suspension that is moveable with respect to the vehicle chassis is disclosed, the adjustable anti-roll bar including a flexible member having a flexible member first side, a flexible member second side, a flexible member proximal end adapted to be coupled to said suspension and a flexible member distal end; a frame operably positioned on said flexible member first side; a sliding member operably positioned on said flexible member second side, said sliding member having a sliding member proximal end and a sliding member distal end, said sliding member proximal end defining a first fulcrum about which said flexible member will bend when said suspension applies force in a first direction to said flexible member proximal end; and an actuating member operably coupled to said sliding member, said actuating member operable to cause said sliding member to move with respect to said flexible member, whereby a position of said first fulcrum with respect to said flexible member moves and a spring rate of said adjustable anti-roll bar changes.

13 Claims, 11 Drawing Sheets

ADJUSTABLE ANTI-ROLL BAR FOR VEHICLES

TECHNICAL FIELD OF THE INVENTION

The present invention generally relates to vehicle suspension systems and, more particularly, to adjustable anti-roll bars for vehicles.

BACKGROUND OF THE INVENTION

Anti-roll bars are used in sprung vehicle suspensions in order to reduce body roll during cornering by adding to the roll resistance of the suspension components such as springs and torsion bars. Springs and torsion bars (referred to hereinafter collectively as "torsion bars") in a vehicle suspension are provided to allow the wheels to maintain maximum contact with the road surface when the vehicle travels over imperfections in the roadway. The presence of the torsion bars in the suspension, however, also allow the vehicle to roll from side to side under cornering, which has many undesirable consequences for vehicle handling, such as reduced cornering traction caused by the changing suspension geometry no longer keeping the bottom of the tire parallel with the road surface. This lifts the edges of the tire, reducing the contact patch size. The use of stiffer torsion bars will reduce the amount of body roll, but at the expense of maintaining maximum road surface tire contact. Therefore, anti-roll bars have been developed in order to increase roll resistance without resorting to overly stiff torsion bars.

Anti-roll bars couple the left and right wheels at one end of the car together while allowing for semi-independent movement of each wheel. When cornering, the bar will twist and form a torsion spring, with the outside end being pushed down and the inside end being lifted. These forces counteract the roll of the vehicle, pushing down on the outside tire and lifting up on the inside tire. On the outside tire, this downward force helps to increase traction. On the inside tire, the bar is lifting up against the suspension torsion bar that is trying to keep the tire on the ground. Therefore, too stiff of an anti-roll bar can actually cause the inside tire to lift off of the ground, which is obviously an undesirable result. It is therefore important to have the appropriate torsion bar rate in the anti-roll bar in order to ensure the appropriate amount of traction for each wheel.

Anti-roll bars are also used to tune the roll coupling of the chassis. Roll coupling is the relationship of the roll resistance of the front of the car and the roll resistance of the rear of the car. The balance of the roll coupling, because of its effect on traction, influences whether the car has a tendency to understeer or oversteer. Increasing the traction of the outside wheel on one end of the car may leave the other end of the car with too little traction to match the performance of the first end. With such an imbalance of traction, one end of the car will lose traction before the other end. If the front end loses traction before the rear end, the car is said to understeer or "push" (i.e. the front of the car moves to the outside of the turning direction as the front tires lose grip). If the rear end loses traction before the front end, the car is said to oversteer or "pull" (i.e. the front of the car moves to the inside of the turning direction as the rear tires lose grip and the rear of the car begins to swing around). Because an adjustable anti-roll bar can adjust the traction of the tires during a turn, it can therefore be used to adjust not only the amount of roll resistance, but also the amount of understeer and oversteer exhibited by the vehicle.

Adjustable anti-roll bars are used in many race cars to adjust the handling of the car for different track conditions, for changing track conditions, and for changing (wearing) tire conditions. A common prior art adjustable anti-roll bar blade component 10 used in race cars is shown in FIGS. 1A-C. The blade 10 is used as a coupling member between the vehicle suspension 12 (only partially illustrated) and the torsion bar 14. The blade 10 and the torsion bar 14 act as two springs in series. When a load is applied to one, the same load is applied simultaneously to the other and both will have some deflection at the same time. By varying the spring rate of the blade 10, the effective spring rate of the series combination will therefore be varied.

In the position shown in FIG. 1A, the suspension 12 may move with respect to the vehicle chassis (not shown), and the suspension 12 acts upon the end of the flexible blade 10 in a direction 16 perpendicular to the wide flat surface of the blade 10. In this position, the blade 10 has maximum flexibility, therefore it produces the lowest spring rate of the blade 10/torsion bar 14 combination. In FIG. 1B, the blade 10 has been rotated 45 degrees from the position shown in FIG. 1A by movement of a member 18 operating on a tab 20 coupled to the blade 10. Rotation of the blade 10 is facilitated by rotary couplings 22 and 24. In this position, the blade 10 is considerably stiffer than in the position of FIG. 1A (i.e. it resists movement in the direction 16 to a greater extent), therefore it produces a higher spring rate of the blade 10/torsion bar 14 combination than the position shown in FIG. 1A. Finally in FIG. 1C, the blade 10 has been rotated a full 90 degrees from the position in FIG. 1A (again, by movement of the member 18) such that the suspension 12 acts upon the end of the flexible blade 10 in a direction parallel to the wide flat surface of the blade 10. In this position, the blade 10 has maximum stiffness, and therefore it produces the highest spring rate of the blade 10/torsion bar 14 combination.

Although the anti-roll bar of FIGS. 1A-C is adjustable, the range of adjustability is fairly limited. Therefore, there remains a need in the art for an improved adjustable anti-roll bar.

SUMMARY OF THE DISCLOSURE

In one embodiment, an adjustable anti-roll bar for a vehicle having a suspension that is moveable with respect to the vehicle chassis is disclosed, the adjustable anti-roll bar comprising a flexible member having a flexible member first side, a flexible member second side, a flexible member proximal end adapted to be coupled to said suspension and a flexible member distal end; a frame operably positioned on said flexible member first side; a sliding member operably positioned on said flexible member second side, said sliding member having a sliding member proximal end and a sliding member distal end, said sliding member proximal end defining a first fulcrum about which said flexible member will bend when said suspension applies force in a first direction to said flexible member proximal end; and an actuating member operably coupled to said sliding member, said actuating member operable to cause said sliding member to move with respect to said flexible member, whereby a position of said first fulcrum with respect to said flexible member moves and a spring rate of said adjustable anti-roll bar changes.

In another embodiment, an adjustable anti-roll bar for a vehicle having a torsion bar and a suspension that is moveable with respect to the vehicle chassis is disclosed, the adjustable anti-roll bar comprising a flexible member having a flexible member first side, a flexible member second side, a flexible member proximal end adapted to be coupled to said suspension and a flexible member distal end; a frame operably positioned on said flexible member first side, said frame having a frame proximal end and a frame distal end rotatably coupled to said torsion bar; a coupling member having a coupling member proximal end operably coupled to said frame, and a coupling member distal end fixedly coupled to said torsion bar; a sliding member operably positioned on said flexible member second side, said sliding member having a sliding member proximal end and a sliding member distal end, said sliding member proximal end defining a first fulcrum about which said flexible member will bend when said suspension applies force in a first direction to said flexible member proximal end; and an actuating member operably coupled to said sliding member, said actuating member operable to cause said sliding member to move with respect to said flexible member, whereby a position of said first fulcrum with respect to said flexible member moves and a spring rate of said adjustable anti-roll bar changes.

DETAILED DESCRIPTION OF THE DISCLOSED EMBODIMENTS

Figure 1A:
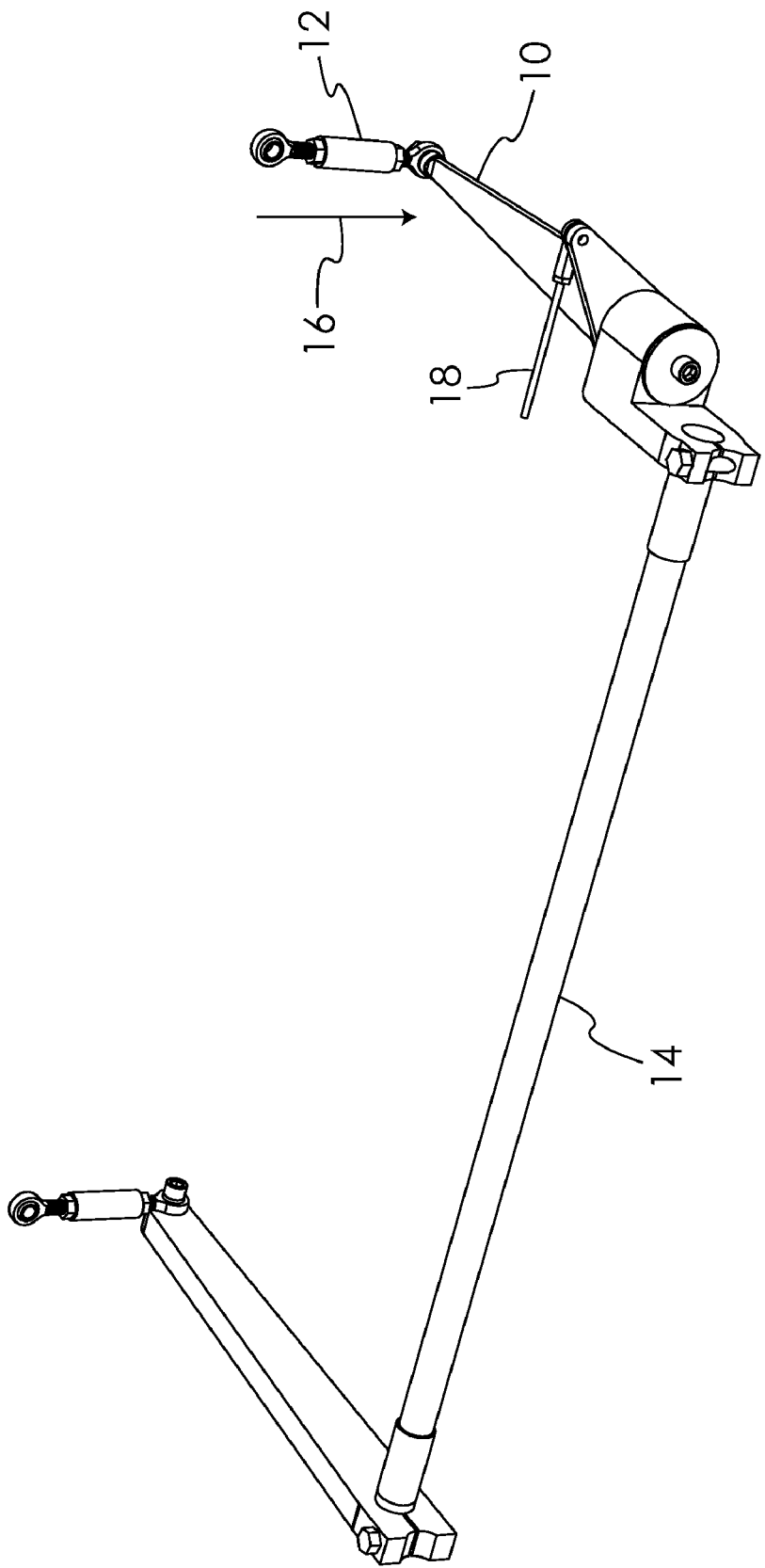
FIGS. 1A-C are perspective views of a prior art adjustable anti-roll bar.
Figure 1B:
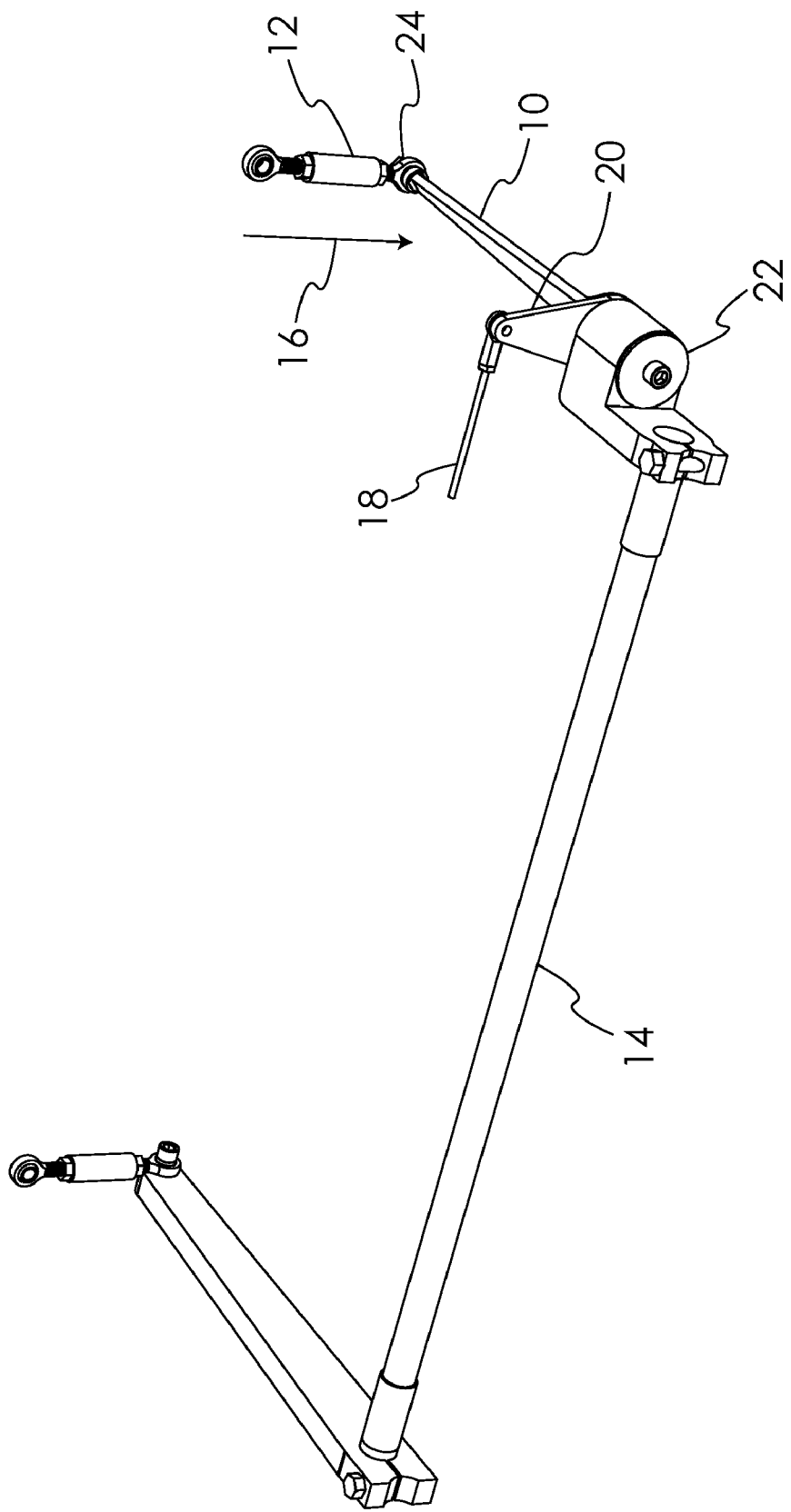
Figure 1C:
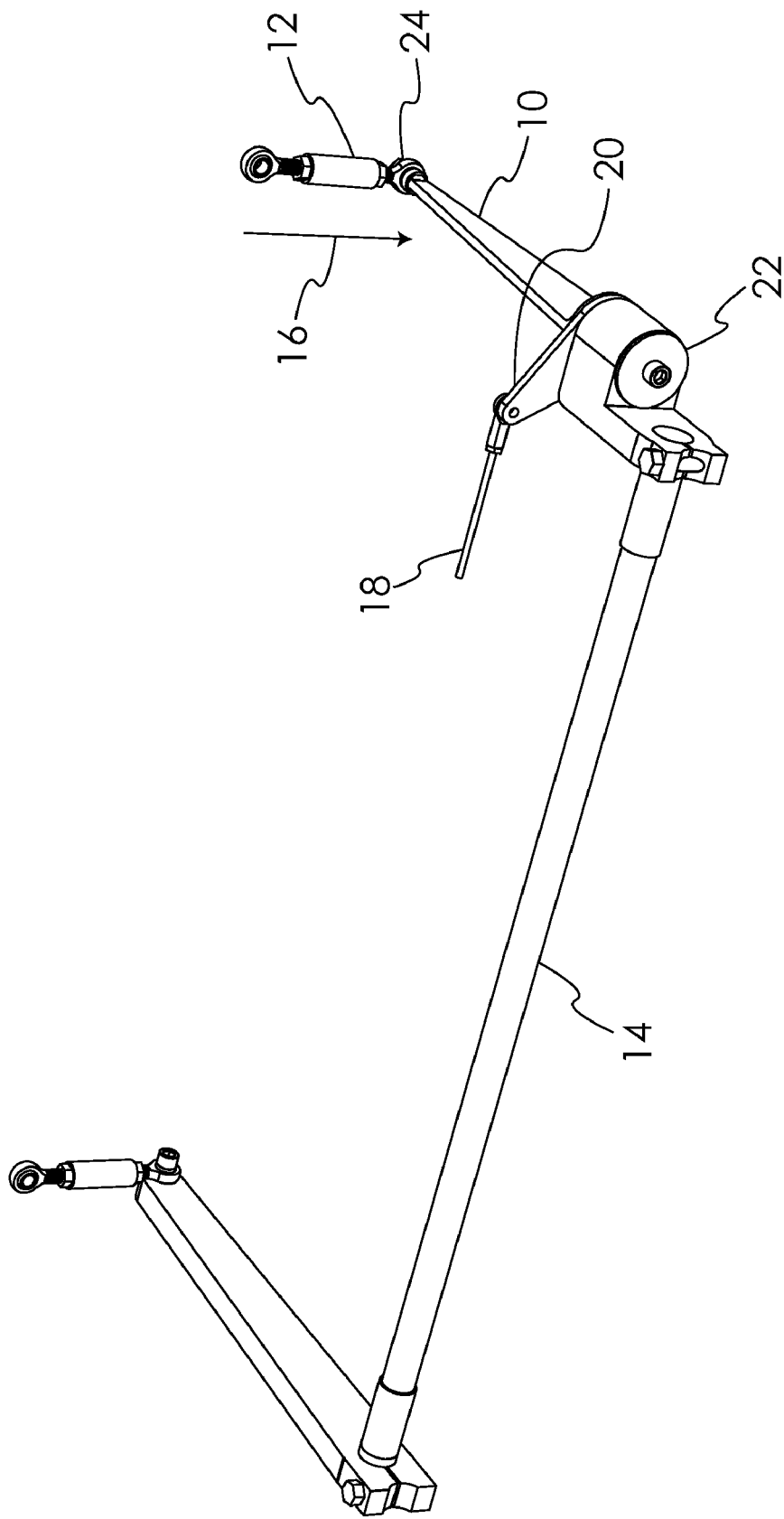

For the purpose of promoting an understanding of the principles of the disclosure, reference will now be made to the embodiments illustrated in the drawings and specific language will be used to describe the same. It will nevertheless be understood that no limitation of the scope of the claims is thereby intended, such alterations and further modifications in the illustrated device, and such further applications of the principles of the disclosure as illustrated therein, being contemplated as would normally occur to one skilled in the art to which the disclosure relates.

The presently disclosed embodiments describe an anti-roll bar system that allows for real-time adjustment of the spring rate from the vehicle cockpit. This allows the driver to adjust the anti-roll spring rate dynamically in order to adjust for changing driving conditions, such as tire wear through the course of a race.

Figure 2:
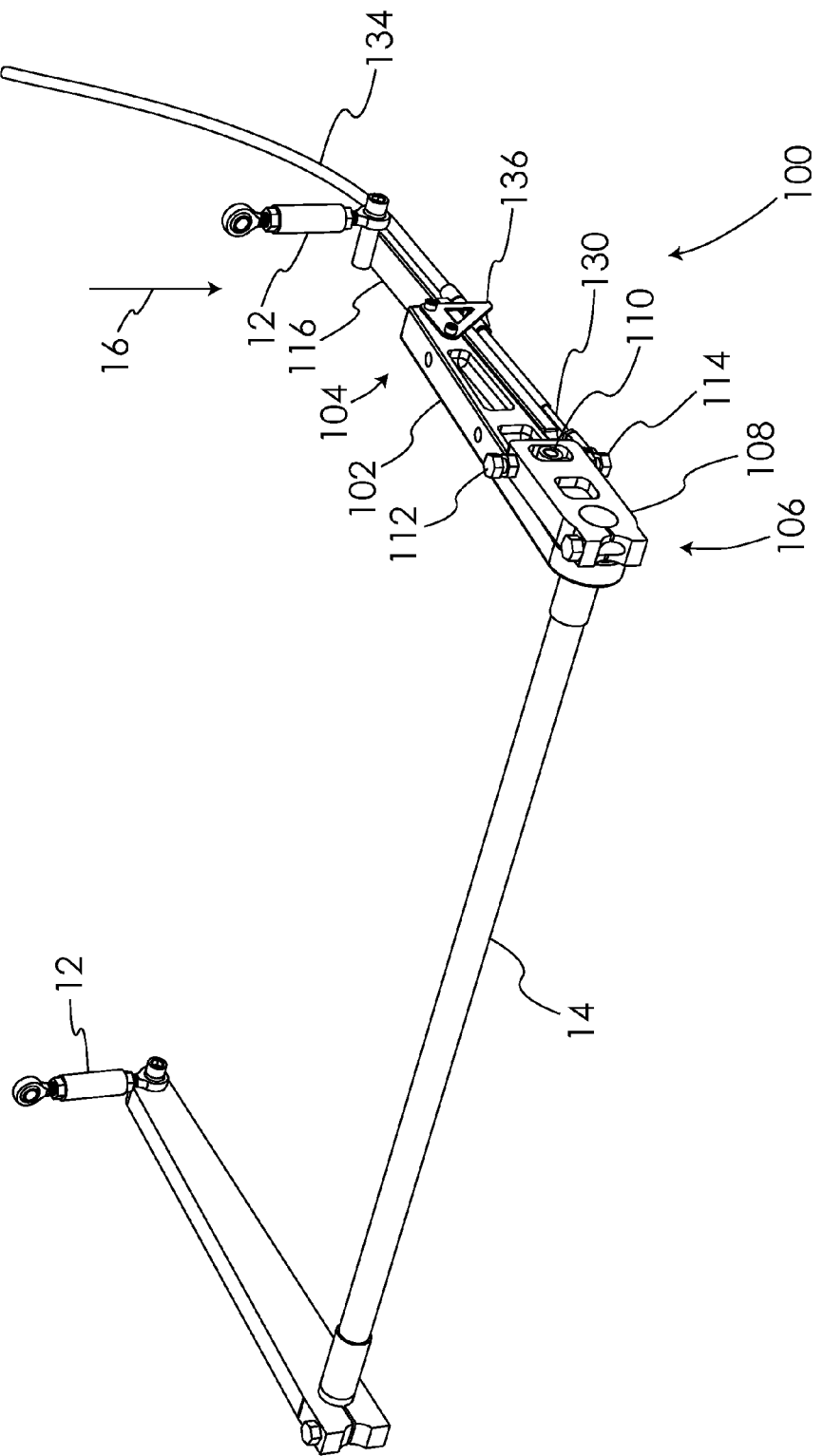
FIG. 2 is a perspective view of an adjustable anti-roll bar according to one embodiment.
Figure 3:
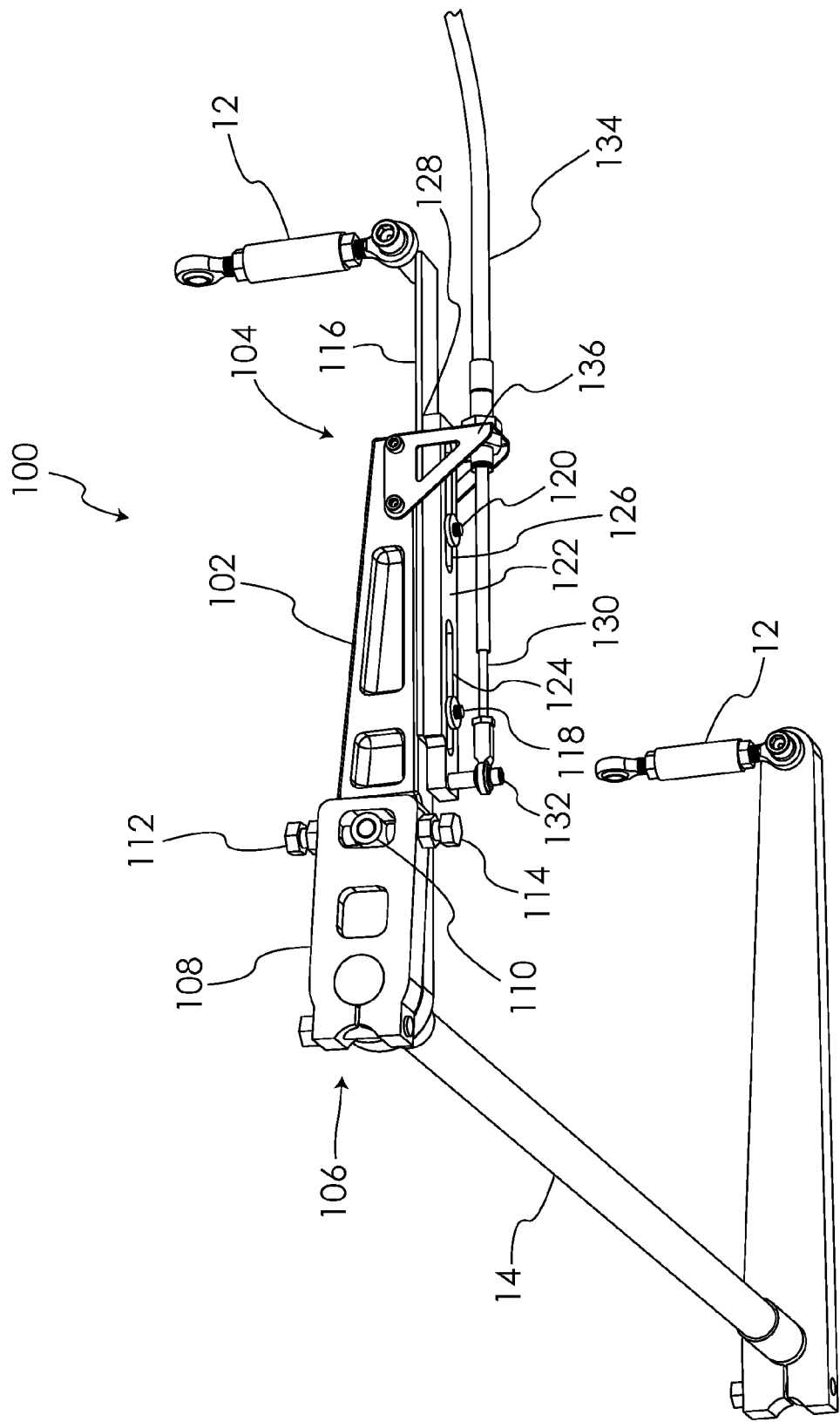
FIG. 3 is a second perspective view of the anti-roll bar of FIG. 2.

Referring to FIGS. 2 and 3, there is illustrated a first embodiment anti-roll bar adjuster, indicated generally at 100. The anti-roll bar adjuster 100 replaces the prior art blade 10 in the anti-roll bar system. Adjuster 100 couples between the vehicle suspension 12 and the torsion bar 14. The adjuster 100 includes a frame 102 having a proximal end 104 and a distal end 106. The distal end 106 of the frame 102 includes an opening (not shown) through which the torsion bar 14 passes. The torsion bar 14 is free to rotate within this opening. The frame 102 is coupled to the torsion bar 14 at the distal end 106 by means of a coupling member 108, which is fixedly mounted to the end of the torsion bar 14, such as by a splined, pinned or bolted connection to name just a few non-limiting examples. The coupling member 108 is in turn coupled to the frame 102 by means of a coupler 110, such as a bolt, screw, pin, or welded connection to name just a few non-limiting examples. Adjustment members 112 and 114 threadingly engage coupling member 108 at positions substantially orthogonal to coupler 110. Adjustment of adjustment members 112 and 114 allow the relative position between the frame 102 and the coupling member 108, and therefore the relative position of the frame 102 and the torsion bar 14, to be adjusted up or down. The frame 102 will rotate around the torsion bar 14 as the adjustment members 112 and 114 are adjusted.

Frame 102 is coupled to the vehicle suspension 12 by means of a flexible member 116. Flexible member 116 is affixed to the frame 102 by means of two connectors 118 and 120. Note that the frame 102 only needs to be operably positioned against the flexible member 116; it is contemplated that the two items may not actually touch, but instead may have an intervening member between them in some embodiments. The connectors 118 and 120 also position a sliding member 122 adjacent the flexible member 116 such that the flexible member 116 lays between the frame 102 and the sliding member 122. Note that the sliding member 122 only needs to be operably positioned against the flexible member 116; it is contemplated that the two items may not actually touch, but instead may have an intervening member between them in some embodiments. Openings 124 and 126 in the sliding member 122 permit the sliding member 122 to move with respect to the flexible member 116. The proximal end of the sliding member 122 defines a fulcrum 128 about which the flexible member 116 will bend when force is applied to the flexible member 116 by the suspension 12.

Actuation of sliding member 122 is accomplished by an actuating member, such as a cable 130 which is coupled to the distal end of the sliding member 122, such as by means of a post 132 or other convenient connecting mechanism. Cable 130 is contained in a jacket 134 in which it is free to slide. The cable 130 is supported by connection of the jacket 134 to the frame 102, such as by two extending members 136.

In operation, translation of the cable 130 causes the sliding member 122 to move with respect to the flexible member 116, thereby moving the location of the fulcrum 128. Moving the location of the fulcrum 128 changes the effective length of the flexible member 116, thereby changing its spring rate. Translation of the cable 130 in either the distal or proximal directions can therefore be used as a means to respectively decrease or increase the spring rate of the anti-roll bar system. As described hereinbelow, the cable 130 may be actuated from the cockpit of the vehicle, thereby allowing the driver of the vehicle to dynamically adjust the spring rate of the anti-roll bar system and thus the handling of the vehicle.

For example, in a race car application, the anti-roll bar 100 may be added to the front suspension of the car. The front suspension geometry of the race car may be set with the anti-roll bar 100/14 disconnected. Once the front suspension geometry is set, the anti-roll bar system 100/14 is connected. This ensures that the anti-roll bar system 100/14 is neutral and is not acting on the suspension 12 until the suspension 12 is loaded. When the car is steered into a turn, the suspension 12 loads the anti-roll bar system 100/14 by applying a force in the direction 16, which causes flexible member 116 to flex and torsion bar 14 to twist. This flexing and twisting creates a force that resists the movement of the axle with respect to the chassis.

By adjusting the position of sliding member 122, and hence the position of the fulcrum 128, the spring rate of the anti-roll bar 100 can be changed and the handling characteristics of the car will change. This adjustment can be made from within the vehicle by the driver through movement of the cable 130. Because the anti-roll bar 100 reduces the spring rate of the system compared to the torsion bar 14 alone, the vehicle may be fitted with the torsion bar 14 size that produces the greatest anti-roll action needed. The anti-roll bar 100 may then be adjusted to lessen the anti-roll action. For example, if a one inch diameter torsion bar 14 is fitted to the car, the anti-roll bar 100 may be adjusted to give anti-roll action equivalent to torsion bar 14 diameters in the range of 0.80 inches to one inch if the cable 130 adjustment mechanism (described hereinbelow) has five positions and each are equivalent to a 0.05 inch torsion bar change.

Figure 4:
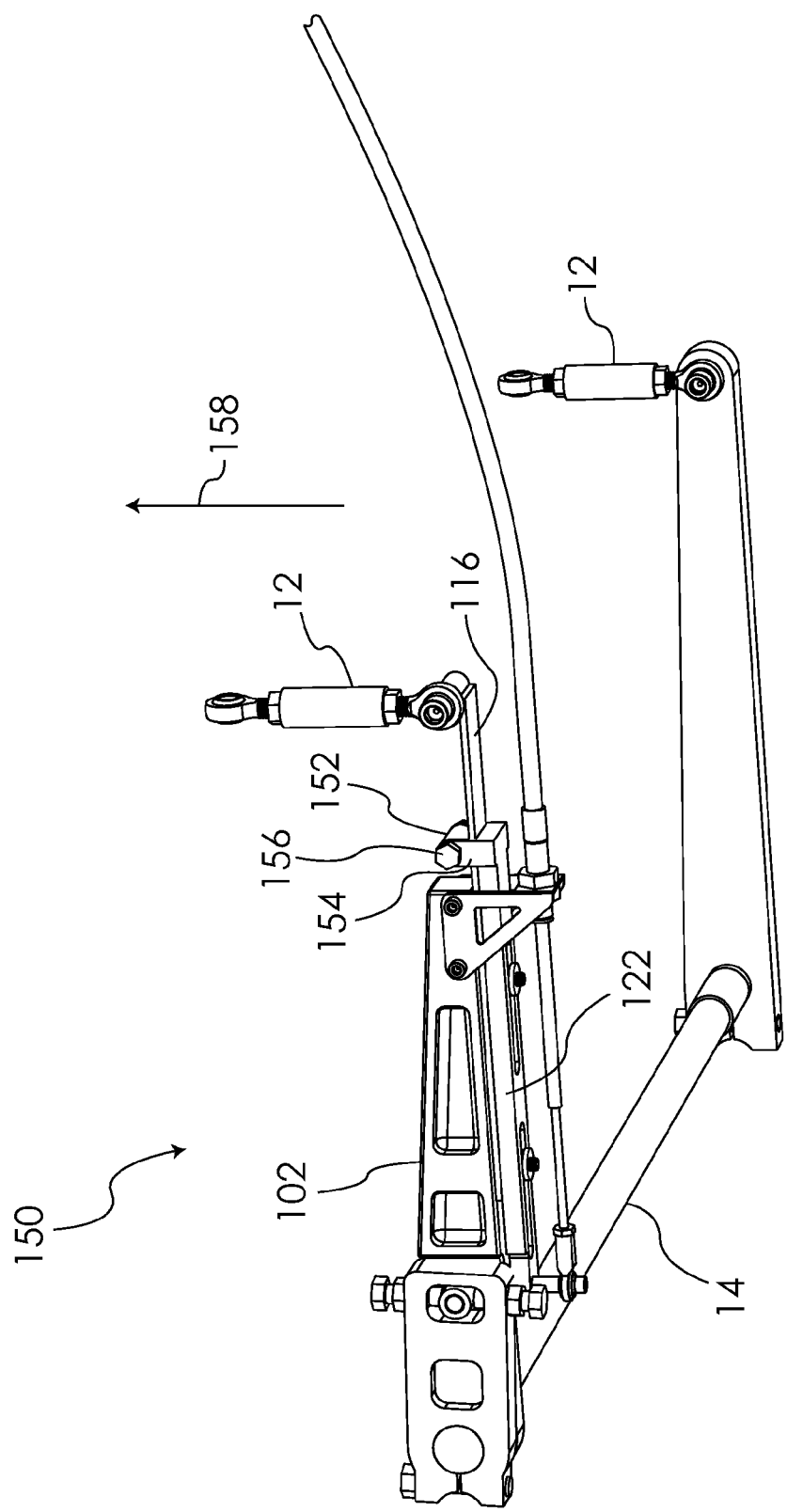
FIG. 4 is a perspective view of an adjustable anti-roll bar according to one embodiment.

Referring now to FIG. 4, there is shown an alternative embodiment anti-roll bar 150. The anti-roll bar 150 is identical to the anti-roll bar 100, with the exception of the addition of a rolling member 152 that captures the flexible member 116 between rolling member 152 and sliding member 122. Rolling member 152 is coupled to sliding member 122 by means of at least one extension 154. A pin 156 extends through the at least one extension 154 and through a central bore in rolling member 152 such that rolling member 152 is free to rotate on pin 156 when sliding member 122 is moved. Provision of the rolling member 156 allows the anti-roll bar 150 to act upon the suspension 12 when the suspension 12 applies a force in the direction 158.

Figure 5:
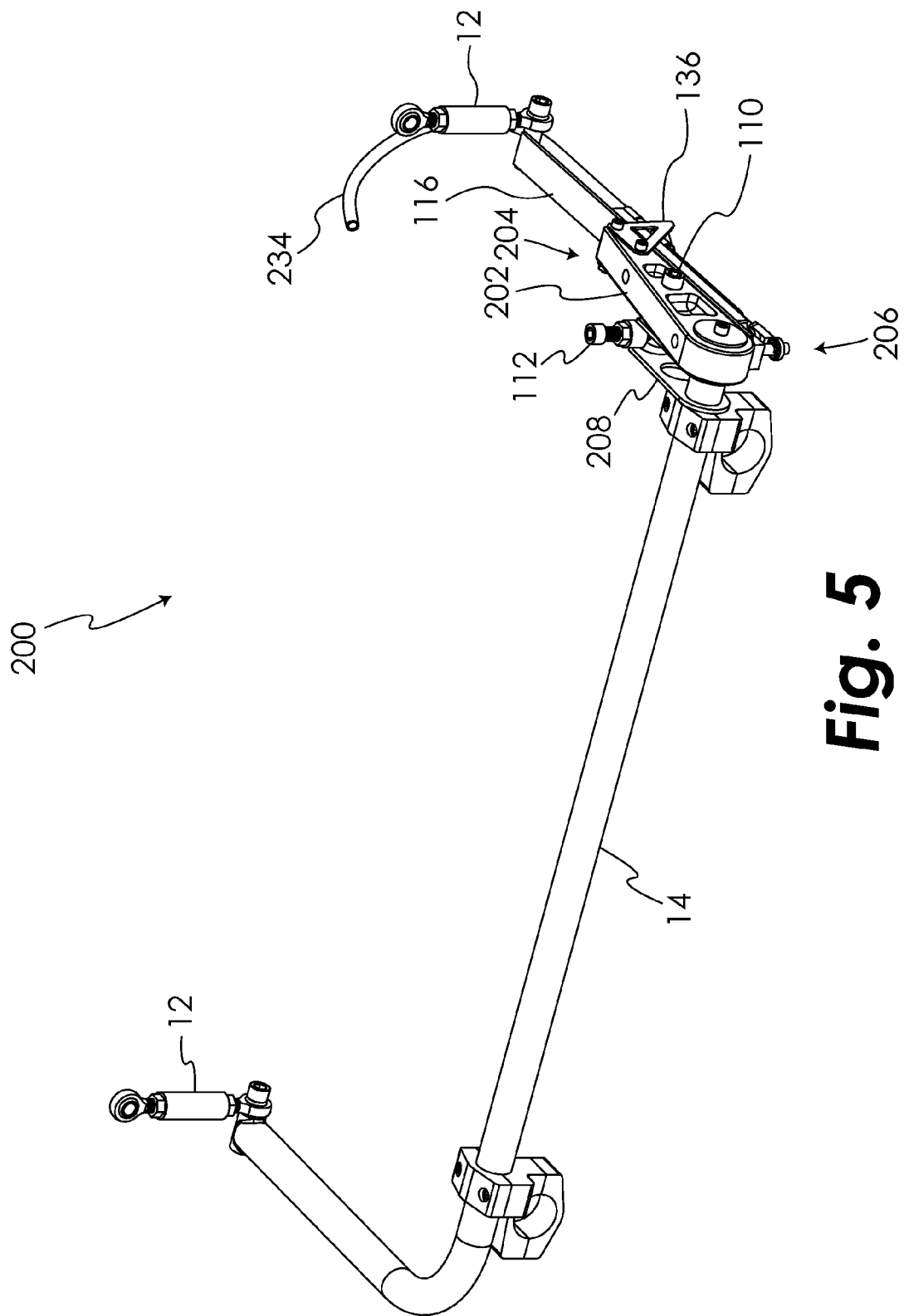
FIG. 5 is a perspective view of an adjustable anti-roll bar according to one embodiment.
Figure 6:
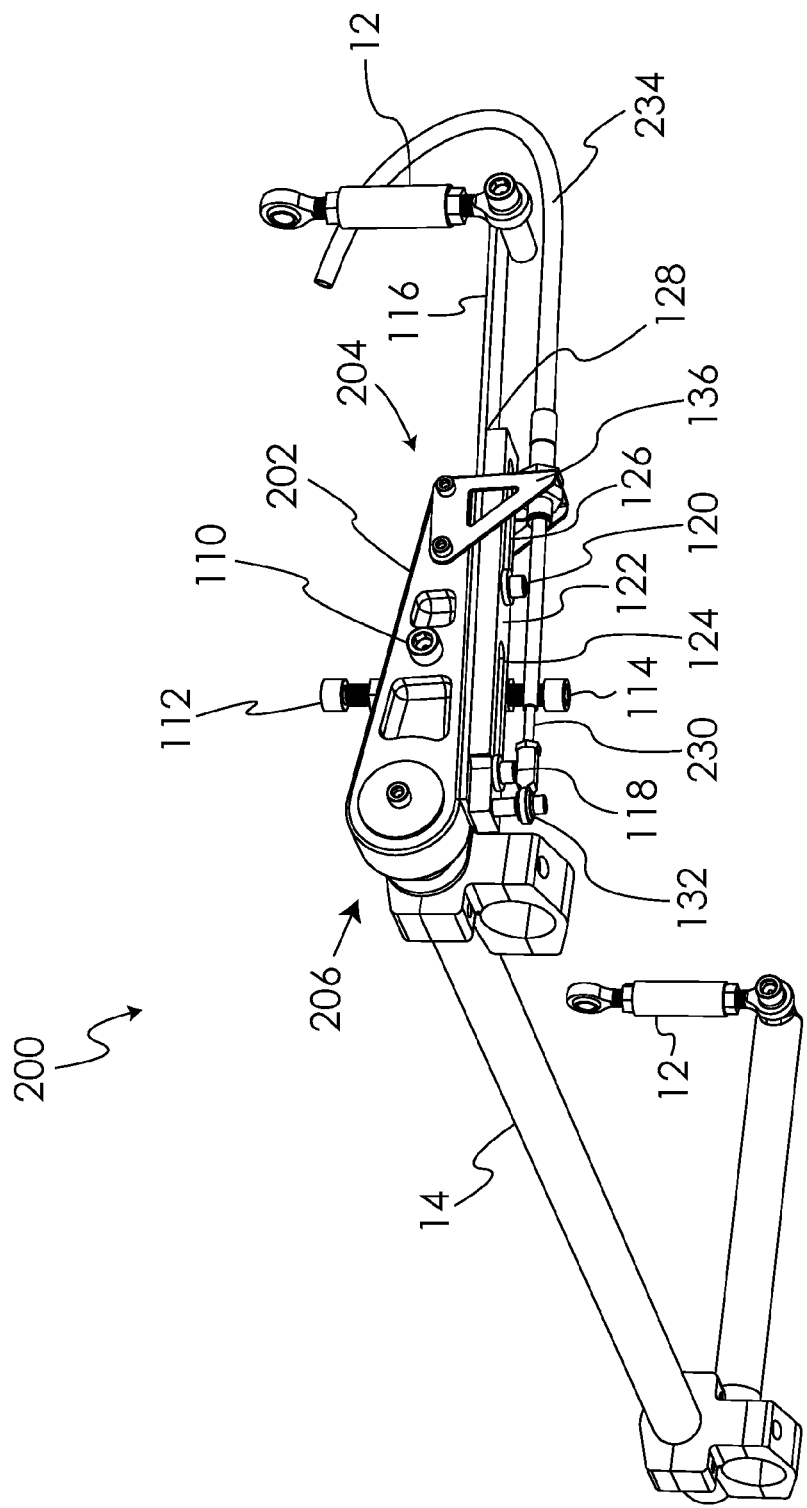
FIG. 6 is a second perspective view of the anti-roll bar of FIG. 5.

Referring now to FIGS. 5 and 6, there is illustrated an embodiment of an adjustable anti-roll bar adapted for use on the rear suspension of certain race cars, such as sprint cars, and indicated generally at 200. The configuration and operation of the anti-roll bar 200 is very similar to the front anti-roll bar 100 and like reference numbers are used to denote like parts. A frame 202 is provided that is rotatably mounted to the end of the torsion bar 14. The frame 202 has a proximal end 204 and a distal end 206. The frame 202 is coupled to the torsion bar 14 at its distal end 206 by means of a coupling member 208, which is fixedly mounted to the torsion bar 14 such as by being welded thereto to name just one non-limiting example. The coupling member 208 is in turn coupled to the frame 202 by means of a bolt 110 as described hereinabove with respect to the anti-roll bar 100. Movement of the fulcrum 128 is affected by translation of a cable 230 within a cable jacket 134. The operation of the anti-roll bar 200 is essentially as described hereinabove with respect to the anti-roll bar 100. It will be appreciated by those skilled in the art that the rolling member 152 assembly of FIG. 4 may be optionally added to the adjustable anti-roll bar 200 in order to allow the anti-roll bar 200 to act upon the suspension 12 when the suspension 12 applies a force in the direction 158.

Figure 7:
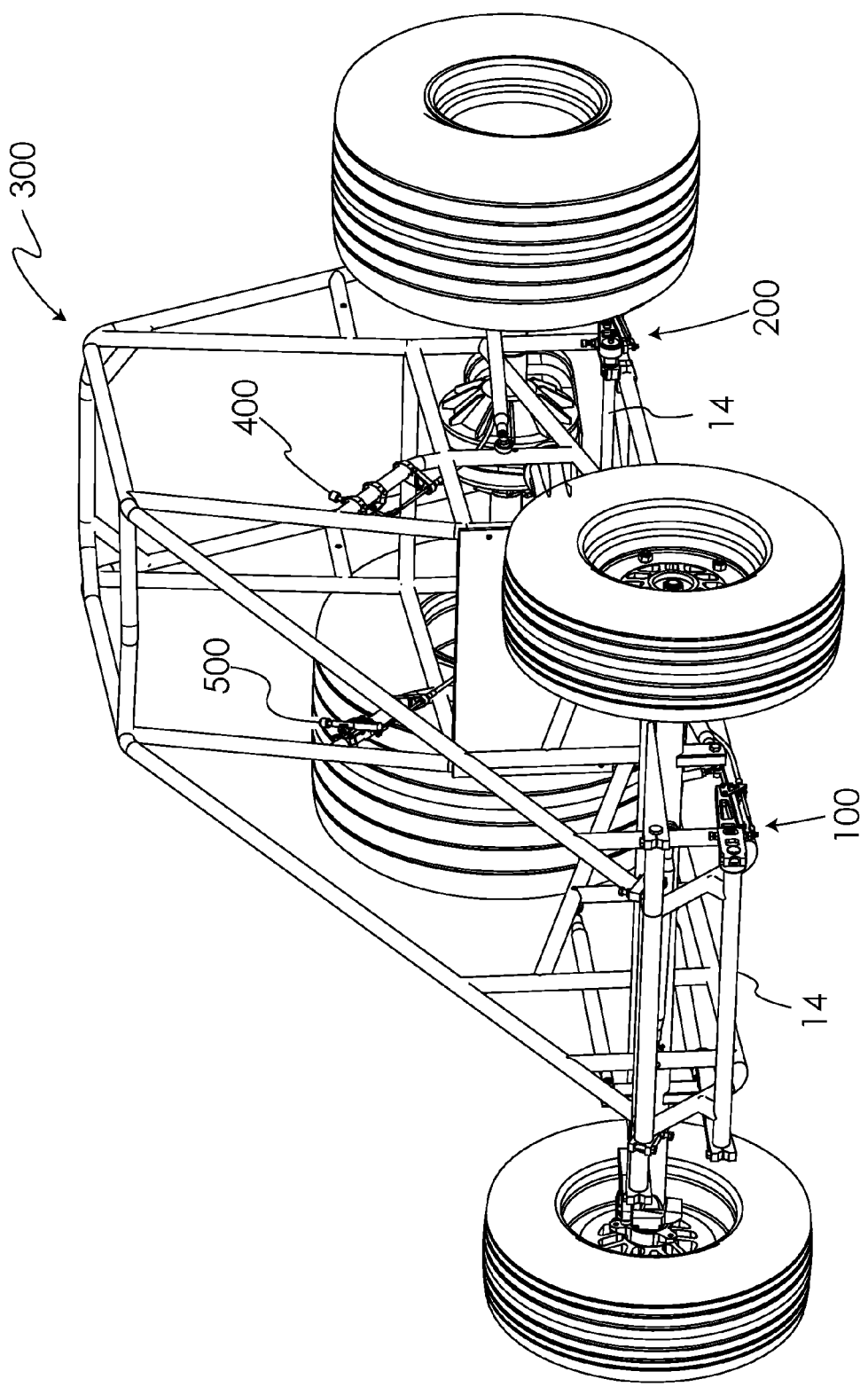
FIG. 7 is a perspective view of the presently disclosed anti-roll bars mounted to a sprint car chassis.

Referring now to FIG. 7, there is shown a sprint car rolling chassis assembly 300 to which the front adjustable anti-roll bar assembly 100 and the rear adjustable anti-roll bar assembly 200 have been fitted. The fulcrum 128 location of the rear adjustable anti-roll bar assembly 200 may be adjusted from the cockpit of the car 300 by means of a rear adjustment control unit 400 mounted within the cockpit. The configuration and operation of rear adjustment control unit 400 is described hereinbelow with respect to FIG. 8. The fulcrum 128 location of the front adjustable anti-roll bar assembly 100 may be adjusted from the cockpit of the car 300 by means of a front adjustment control unit 500 also mounted within the cockpit. The configuration and operation of front adjustment control unit 500 is described hereinbelow with respect to FIG. 9.

Figure 8:
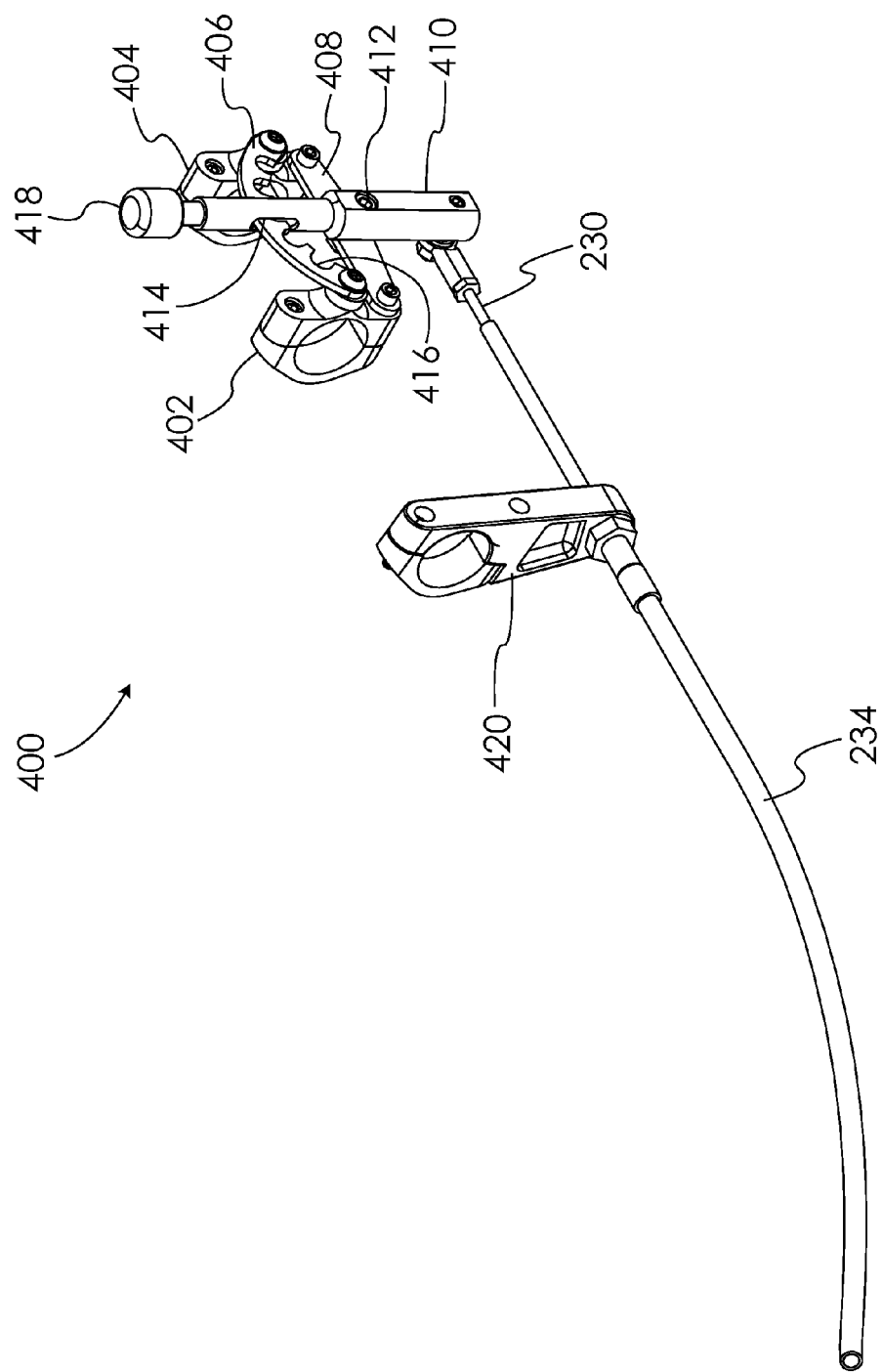
FIG. 8 is a perspective view of a rear adjustment control unit according to one embodiment.

Referring now to FIG. 8, rear adjustment control unit 400 is illustrated. Rear adjustment control unit 400 may be mounted within reach of the driver in the cockpit in any convenient location, such as by mounting it to a chassis 300 frame member using bolted mounting connectors 402 and 404, or any other convenient mounting method. A rear adjustment control unit position locator 406 is coupled to mounting connectors 402/404, as is a pivot plate 408.

A rear adjustment handle 410 is coupled to the pivot plate 408 by means of a pin 412, around which the rear adjustment handle 410 is free to rotate. The rear adjustment control unit position locator 406 passes through an opening 414 in the rear adjustment handle 410. A detent mechanism (not shown) within the rear adjustment handle 410 engages the indentations 416 formed in the rear adjustment control unit position locator 406 in order to hold the rear adjustment control unit position locator 406 in the position selected by the driver. Actuation of the button 418 allows repositioning of the rear adjustment handle 410 with respect to the rear adjustment control unit position locator 406.

Also attached to the chassis 300 frame member is a cable jacket support 420 that provides a support for the cable jacket 234. Cable 230 is attached to the rear adjustment handle 410 such that pivoting movement of the rear adjustment handle 410 about the pin 412 causes the cable 230 to translate within the cable jacket 234, thereby causing movement of the fulcrum 128 of the rear adjustable anti-sway bar 200, as described hereinabove. Therefore, the rear adjustment control unit 400 allows the driver to dynamically adjust the rear adjustable anti-sway bar 200 while driving the car, thereby allowing the driver to adjust the suspension to account for changing track or vehicle conditions.

Figure 9:
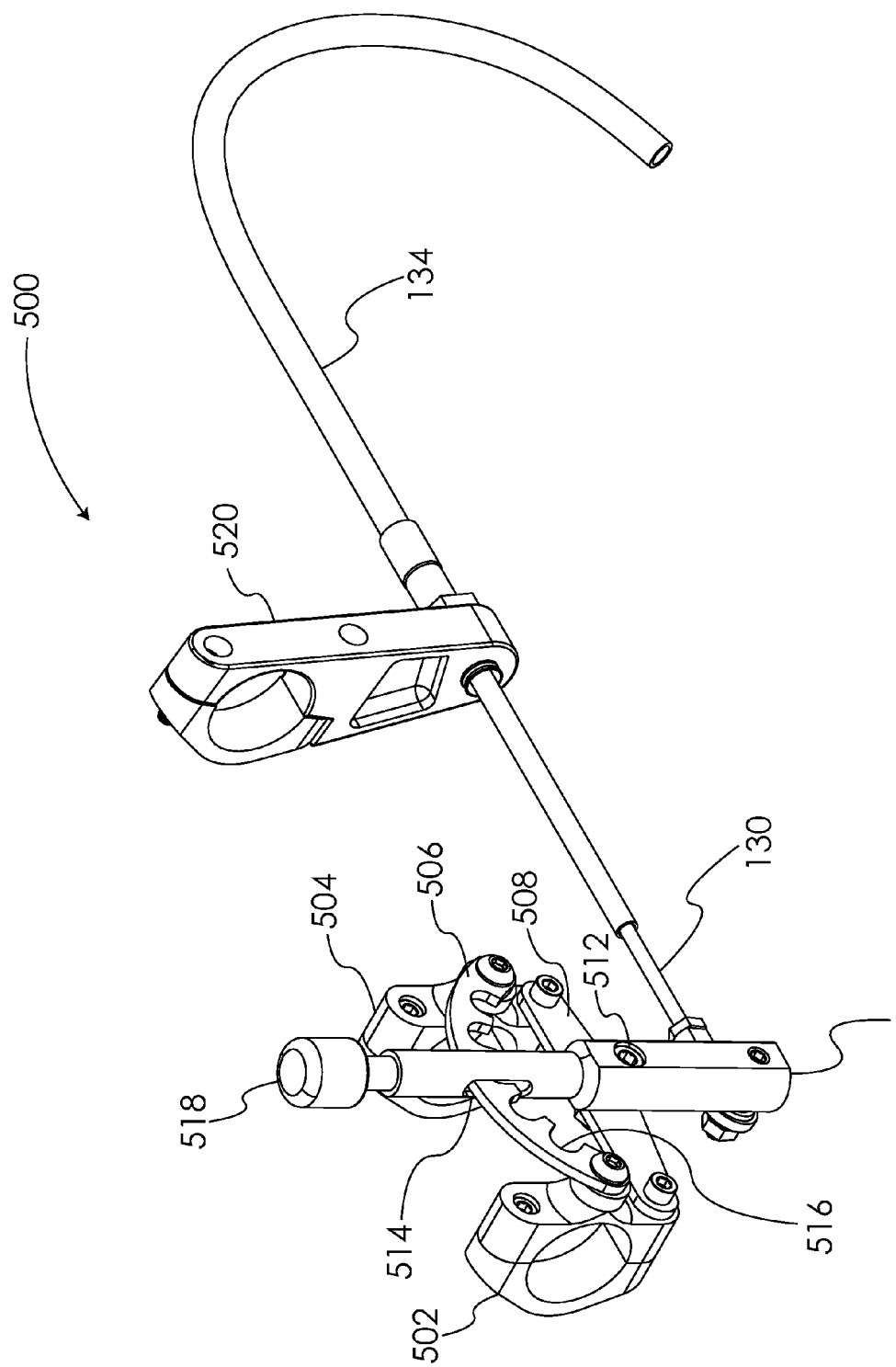
FIG. 9 is a perspective view of a front adjustment control unit according to one embodiment.

Referring now to FIG. 9, front adjustment control unit 500 is illustrated. Front adjustment control unit 500 may be mounted within reach of the driver in the cockpit in any convenient location, such as by mounting it to a chassis 300 frame member using bolted mounting connectors 502 and 504, or any other convenient mounting method. A front adjustment control unit position locator 506 is coupled to mounting connectors 502/504, as is a pivot plate 508.

A front adjustment handle 510 is coupled to the pivot plate 508 by means of a pin 512, around which the front adjustment handle 510 is free to rotate. The front adjustment control unit position locator 506 passes through an opening 514 in the front adjustment handle 510. A detent mechanism (not shown) within the front adjustment handle 510 engages the indentations 516 formed in the front adjustment control unit position locator 506 in order to hold the front adjustment control unit position locator 506 in the position selected by the driver. Actuation of the button 518 allows repositioning of the front adjustment handle 510 with respect to the front adjustment control unit position locator 506.

Also attached to the chassis 300 frame member is a cable jacket support 520 that provides a support for the cable jacket 134. Cable 130 is attached to the front adjustment handle 510 such that pivoting movement of the front adjustment handle 510 about the pin 512 causes the cable 130 to translate within the cable jacket 134, thereby causing movement of the fulcrum 128 of the front adjustable anti-sway bar 200, as described hereinabove. Therefore, the front adjustment control unit 500 allows the driver to dynamically adjust the front adjustable anti-sway bar 100 while driving the car, thereby allowing the driver to adjust the suspension to account for changing track or vehicle conditions.

While the disclosure has been illustrated and described in detail in the drawings and foregoing description, the same is to be considered as illustrative and not restrictive in character. It should be understood that only the preferred embodiments have been shown and described and that all changes and modifications that come within the spirit of the disclosure are desired to be protected. For example, the presently disclosed adjustable anti-roll bar may be used without a torsion bar, wherein the adjustable anti-roll bar would provide the entire spring rate.

What is claimed is:

1. An adjustable anti-roll bar for a vehicle having a suspension that is moveable with respect to the vehicle chassis, the adjustable anti-roll bar comprising:
   a flexible member having a flexible member first side, a flexible member second side, a flexible member proximal end adapted to be coupled to said suspension and a flexible member distal end;
   a frame operably positioned on said flexible member first side;
   a sliding member operably positioned on said flexible member second side, said sliding member having a sliding member proximal end and a sliding member distal end, said sliding member proximal end defining a first fulcrum about which said flexible member will bend when said suspension applies force in a first direction to said flexible member proximal end; and
   an actuating member operably coupled to said sliding member, said actuating member operable to cause said sliding member to move with respect to said flexible member, whereby a position of said first fulcrum with respect to said flexible member moves and a spring rate of said adjustable anti-roll bar changes.

2. The adjustable anti-roll bar of claim 1, wherein said frame abuts said flexible member first side.

3. The adjustable anti-roll bar of claim 1, wherein said sliding member abuts said flexible member second side.

4. The adjustable anti-roll bar of claim 1, wherein said sliding member further comprises:
   a first opening;
   a second opening;
   a first coupler extending through said first opening, through said flexible member, and into said frame;
   a second coupler extending through said second opening, through said flexible member, and into said frame, whereby said flexible member is coupled to said frame and said sliding member is held in abutting relationship with said flexible member.

5. The adjustable anti-roll bar of claim 1, wherein said actuating member comprises a cable.

6. The adjustable anti-roll bar of claim 1, further comprising:
   a roller coupled to said sliding member proximal end, said roller operably positioned on said flexible member first side substantially defining a second fulcrum about which said flexible member will bend when said suspension applies force in a second direction, opposite said first direction, to said flexible member proximal end.

7. An adjustable anti-roll bar for a vehicle having a torsion bar and a suspension that is moveable with respect to the vehicle chassis, the adjustable anti-roll bar comprising:
   a flexible member having a flexible member first side, a flexible member second side, a flexible member proximal end adapted to be coupled to said suspension and a flexible member distal end;
   a frame operably positioned on said flexible member first side, said frame having a frame proximal end and a frame distal end rotatably coupled to said torsion bar;
   a coupling member having a coupling member proximal end operably coupled to said frame, and a coupling member distal end fixedly coupled to said torsion bar;
   a sliding member operably positioned on said flexible member second side, said sliding member having a sliding member proximal end and a sliding member distal end, said sliding member proximal end defining a first fulcrum about which said flexible member will bend when said suspension applies force in a first direction to said flexible member proximal end; and
   an actuating member operably coupled to said sliding member, said actuating member operable to cause said sliding member to move with respect to said flexible member, whereby a position of said first fulcrum with respect to said flexible member moves and a spring rate of said adjustable anti-roll bar changes.

8. The adjustable anti-roll bar of claim 7, wherein said frame abuts said flexible member first side.

9. The adjustable anti-roll bar of claim 7, wherein said sliding member abuts said flexible member second side.

10. The adjustable anti-roll bar of claim 7, wherein said sliding member further comprises:
    a first opening;
    a second opening;
    a first coupler extending through said first opening, through said flexible member, and into said frame;
    a second coupler extending through said second opening, through said flexible member, and into said frame, whereby said flexible member is coupled to said frame and said sliding member is held in abutting relationship with said flexible member.

11. The adjustable anti-roll bar of claim 7, wherein said actuating member comprises a cable.

12. The adjustable anti-roll bar of claim 7, further comprising:
    a roller coupled to said sliding member proximal end, said roller operably positioned on said flexible member first side substantially defining a second fulcrum about which said flexible member will bend when said suspension applies force in a second direction, opposite said first direction, to said flexible member proximal end.

13. The adjustable anti-roll bar of claim 7, further comprising:
    a first coupler coupled to said frame and extending at least part way through an opening in said coupling member;
    a first adjustment member threadingly engaged with said coupling member and extending into said opening and oriented substantially 90 degrees to said first coupler; and
    a second adjustment member threadingly engaged with said coupling member and extending into said opening and oriented substantially 90 degrees to said first coupler;
    whereby movement of said first and second adjustment members with respect to said coupling member applies a force to said first coupler and causes said coupling member to move with respect to said frame.

* * * * *